PULSE CODE COMMUNICATION SYSTEM

Filed Jan. 20, 1948 2 Sheets-Sheet 1

INVENTORS
EDMOND M. DELORAINE
BEN ALEXANDER
BY
R P Morris
ATTORNEY

June 6, 1950 B. ALEXANDER ET AL 2,510,054

PULSE CODE COMMUNICATION SYSTEM

Filed Jan. 20, 1948 2 Sheets-Sheet 2

INVENTORS
EDMOND M. DELORAINE
BEN ALEXANDER

BY R. P. Morris

ATTORNEY

Patented June 6, 1950 2,510,054

UNITED STATES PATENT OFFICE 2,510,054

PULSE CODE COMMUNICATION SYSTEM

Ben Alexander, Nutley, N. J., and Edmond Maurice Deloraine, New York, N. Y., assignors to International Standard Electric Corporation, New York, N. Y., a corporation of Delaware Application January 20, 1948, Serial No. 3,236

8 Claims. (Cl. 250—6)

This invention relates to radio communication systems and more particularly to communication systems employing pulses for the conveying of telephonic messages.

In the copending application of E. M. Deloraine and B. Alexander for "Communication system," Serial No. 3,235 filed January 20, 1948 a method of communication has been disclosed wherein a signal, having the form of a complex wave, may be transmitted and received by means of pulses assuming two alternative variations in respect to a given characteristic thereof. That method makes use of a so-called "two pulse code" in which the time spacing between the pulses of consecutive pulses or pulse pairs that are being transmitted, is significant as to intelligence. Such systems have the advantage that the message to be transmitted is comparatively little affected by outside interference since such interference modifies in only a small measure the position of such pulses along a time axis. Moreover, in such systems, it is possible to completely block the receiver circuits during all of the time in which no pulse is to be received, which, of course, eliminates all possible interference during such time. More specifically, the above method contemplates the use of a receiver wherein consecutive pulse pairs, the individual pulses of which are spaced in accordance with the intelligence to be conveyed, are converted into individual positive and negative pulse significant of the intelligence supplied to the transmitter and which are demodulated into unit steps of voltage in accordance with the polarity of the pulses.

It is an object of the present invention to adapt the above method to the transmission of telephonic messages.

It is a further object to provide a method for conveying telephonic messages by means of amplitude modulated pulses, as by having pulses present for a positive unit step and having no pulses for a negative unit step in accordance with the above-described method.

In accordance with certain features of the invention, the system provides for continuous high frequency keying of a radio frequency transmitter, which keying is interrupted by a suitable voltage which persists for the duration of time that a given input signal exceeds the immediately-preceding signal amplitude as obtained from a demodulator in the transmitter circuit. Thus the transmitter is being keyed except during those periods when the input telephonic signal to the transmitter is of greater amplitude than that of the intelligence already transmitted. In the receiver of the system, the signals are demodulated and detected to yield pulses which are translated into speech in accordance with the transmitted message.

The above-mentioned and other features and objects of this invention will become more apparent and the invention itself, though not necessarily defined by said features and objects, will be best understood, by reference to the following description of an embodiment of the invention taken in connection with the accompanying drawings, wherein.

Figure 1:
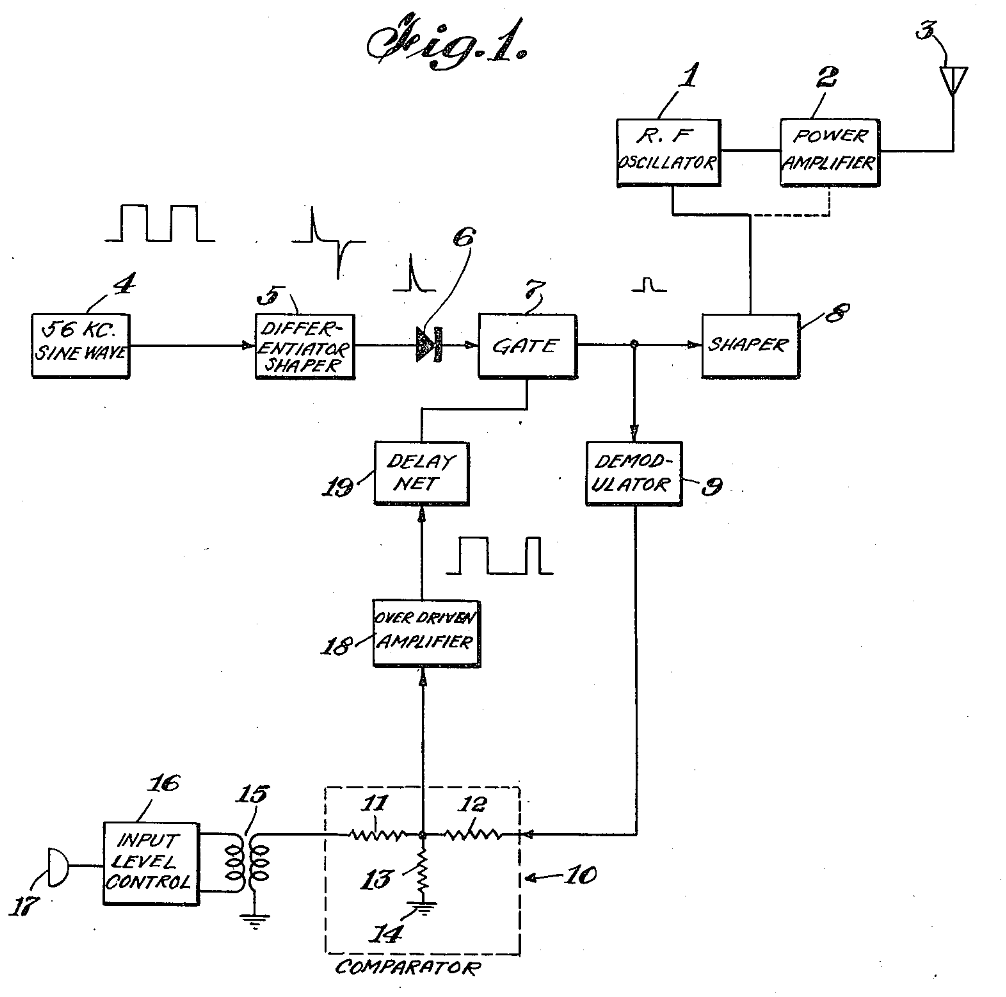
Fig. 1 is a diagram, partly in schematic and partly in block form, of a transmitter circuit in accordance with the present invention.

Referring to the drawings, the circuit of Fig. 1 comprises a continuous wave transmitter including a radio frequency oscillator 1 and a power amplifier 2 feeding into a suitable antenna 3. This transmitter is keyed by pulses which are derived from a sine wave generator 4, working for example at 56 kc. The sine wave being shaped and differentiated in the differentiator circuit 5. The resulting negative pulses of this wave are removed by rectification by a suitable rectifier 6 and the remaining positive pulses, are supplied to the grid of a normally open gate circuit indicated at 7. The output of the gate circuit is preferably shaped to yield pulses which are most economical of the frequency band width employed. These pulses are employed for keying the transmitter by way of a shaping circuit 8. The output of the gate circuit 7 is also fed directly to a demodulator circuit 9 which is identical to the one used in the receiver circuit of Fig. 2 and which will be described in connection therewith. The demodulator circuit 9 has its output fed into a comparator circuit 10. The comparator circuit 10, which is comprised of three resistances 11, 12 and 13 arranged in T form, the leg, that is resistance 13 being grounded at 14, also receives over resistance 11, the speech signal input by way of a coupling device 15 as obtained from a speech level control circuit 16 and a speech input device such as a microphone 17. The arrangement is such that the voltage-to-ground at the crossing of T is proportional to the difference in amplitude between the input signal and the demodulator output in resistance 12. This differential voltage is then amplified and limited in an over-driven amplifier circuit 18 which yields a negative square wave for the duration of time that the input signal exceeds the demodulator output. These square waves are preferably subjected to a slight delay in a delay network 19 corresponding to the width of the keying pulses 6 and are then used to close the gate circuit 7. Thus regularly repeated positive pulses are transmitted, except during the intervals when the gate is closed by negative square waves. It will be clear that if desired gate 7 may be normally closed and may be arranged to transmit pulses only during the periods the square waves are effective.

Figure 2:
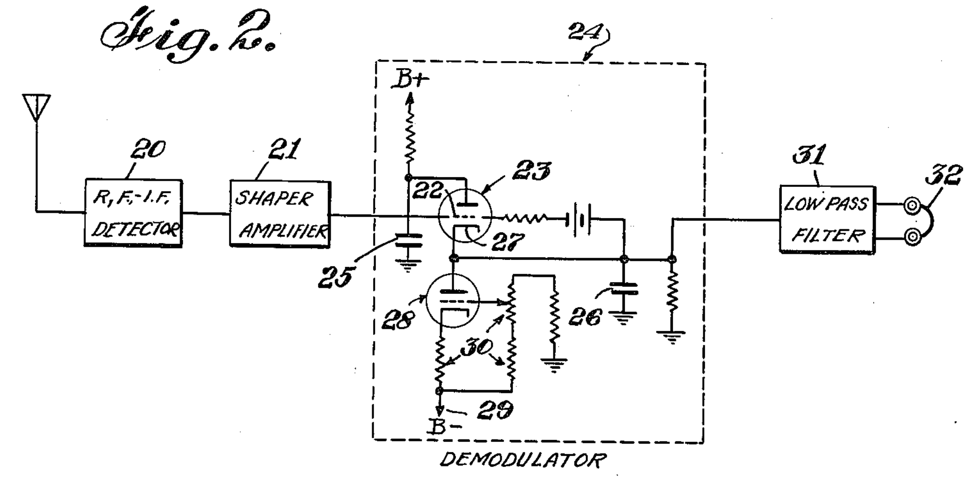
Fig. 2 is a diagram, partly in schematic and partly in block form, of a receiver for the present system.

The receiver circuit shown in Fig. 2 includes conventional radio frequency, I. F., and the detector circuits indicated in the block 20 which yield pulses that are shaped into large rectangular pulses of very short duration (say 1 microsecond) in the shaper amplifier circuit 21. These pulses are applied to grid 22, of triode 23, which is normally biased beyond cut-off and which forms part of a demodulator circuit 24 shown in block diagram which is identical to the one referred to at 9 in Fig. 1. A bucket or initial storage condenser 25 in the plate circuit of the triode 23 is made to discharge into a storage condenser 26 wherever the pulses applied to the grid 22 render the triode 23 conductive. The storage condenser 26 is arranged in the grounding circuit of cathode 27 of the tube 23. In circuit parallel with the grounded storage condenser 26, there is provided a second triode 28 which, because of a fixed bias, as indicated at 29, and the high feed-back represented by the resistance circuit 30, acts as a constant current generator serving to discharge the storage condenser 26 at a constant rate during conduction periods of the triode 23. The resistance values in the constant current generator circuit to ground are chosen such that, in the time between successive pulses to the grid 22, the storage condenser 26 loses a portion of the charge due to the action of the constant current generator 28 which is equal to half the charge it gains from one discharge of the bucket condenser 25. Since the transmitter, indicated in Fig. 1, determines whether pulses are to be transmitted at any given instant by comparing the voltage across the storage condenser of a similar demodulating circuit with that of the input speech, this storage condenser voltage, when subjected to low-pass filtering, as in circuit 31, supplies the original speech at the receiver to an earphone device 32.

Figure 3:
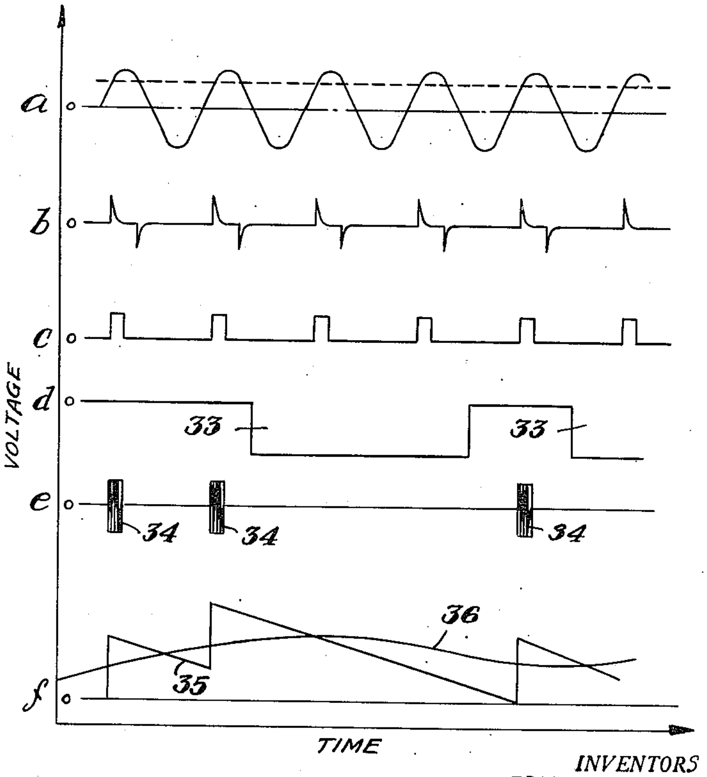
Fig. 3 is a series of graphs illustrating certain operating conditions of the circuits of Figs. 1 and 2.

Referring now to Fig. 3, the operating characteristics of the circuits discussed above will become apparent by reference thereto. Thus in graph *a* (Fig. 3) the type of high frequency sine wave which is supplied by the generator circuit 4 is indicated and which, by suitable shaping and differentiation is converted into a wave indicated at graph *b*, comprised of narrow positive and negative pulses. After the removal by rectification of the negative pulses and clipping and amplification the wave assumes the character shown in graph *c*. The width of these pulses via an illustrative example being preferably 1 microsecond, the rate of occurrence being 56 kc. These are the keying pulses which are applied to the transmitter circuits 1 and 2 at a continuous rate except for the period when the negative square wave obtained from the comparator circuit 10 signifies that the input signal amplitude exceeds the output of the demodulator circuit 9, as during periods indicated at 33 of graph *d*. Thus the output of the transmitter is shown in graph *e* where pulses 34, comprised of the 1 microsecond pulses, are transmitted at varying intervals of time, depending upon the character of the wave in graph *d*. The delay which is experienced by the negative square wave obtained from the amplifier 18 in the delay network 19 is, as already indicated, of the order of the width of the keying pulses, that is, approximately 1 microsecond. Thus the receiver will be subjected to signals which provide a pulse group for a positive unit step at the transmitter and omit the pulses for a negative unit step. These pulses are then demodulated and translated into the original speech at the receiver.

Graph *f* of Fig. 3 illustrates the operation of the demodulator. Each received pulse corresponding to pulses 34 of curve *e* serves to impress a given charge on storage condenser 26, which is dissipated at a rate determined by tube 28 and its associated circuit. The voltage of condenser 26 thus takes the form of curve 35 as shown. Removal of the high frequency components in filter 31 provides the audio envelope represented by curve 36.

While we have described above the principles of our invention in connection with specific apparatus, it is to be clearly understood that this description is made only by way of example and not as a limitation on the scope of our invention.

What is claimed is:

1. A communication system for transmitting a complex intelligence wave, comprising a source of electrical pulses, a transmitter, means to key said transmitter by said pulses, a demodulator circuit to demodulate said pulses, a source of complex intelligence waves, a comparator circuit, means for applying energy of said intelligence waves and energy from said demodulator circuit to said comparator circuit to provide an output voltage dependent upon the difference of said energies and means for applying said voltage to control said pulses at said transmitter, whereby pulses are transmitted representative of said wave.

2. A communication system using discrete pulses for transmitting a complex intelligence wave, comprising a transmitter system including a source of electrical pulses, a gate circuit, means for applying pulses from said source to said gate circuit, a transmitter, means coupling said gate circuit to said transmitter to key said transmitter by pulses passing said gate circuit, a demodulator circuit coupled to the output of said gate circuit, a source of complex intelligence waves, a comparator circuit, means for applying energy of said intelligence waves and energy from said demodulator circuit to said comparator circuit in phase opposition to provide a voltage, dependent upon the difference of said energies, having a predetermined polarity and amplitude, and means for applying said voltage to control passage of said pulses to said gate circuit whereby pulses are transmitted representative of said wave.

3. A pulse code transmitter including a source of electrical pulses, a gate circuit, means for applying pulses from said source to said gate circuit, a transmitter, means coupling said gate circuit to said transmitter to key said transmitter by pulses passing said gate circuit, a demodulator circuit coupled to the output of said gate circuit, a source of complex intelligence waves, a comparator circuit, means for applying energy of said intelligence waves and energy from said demodulator circuit to said comparator circuit to provide an output voltage dependent upon the difference of said energies, means for translating said output voltage into a control voltage having a predetermined polarity and amplitude dependent upon the difference between said intelligence wave energy and said demodulator energy, and means for applying said output voltage to said gate circuit to control said gate in response to said predetermined voltage, whereby pulses are representative of said signals transmitted.

4. A pulse code transmitter including a source of electrical pulses, a normally open gate circuit, means for applying pulses from said source to said gate circuit, a radio transmitter, means coupling said gate circuit to said radio transmitter to key said transmitter by pulses passing said gate circuit, a demodulator circuit coupled to the output of said gate circuit, a source of complex intelligence waves, a comparator circuit, means for applying energy of said intelligence waves and energy from said demodulator circuit to said comparator circuit in phase opposition to provide an output voltage dependent upon the difference of said energies, means for translating said output voltage into a control voltage having a predetermined polarity and amplitude wherever said intelligence wave energy exceeds said demodulator energy, a delay device for said control voltage and means for applying the delayed voltage from said delay device to said gate circuit to close said gate to said pulses in response to said predetermined voltage, whereby pulses are transmitted during other periods only.

5. A communication system for transmitting a complex intelligence wave, comprising a source of electrical pulses, a transmitter, means to key said transmitter by said pulses, a demodulator circuit to demodulate said pulses, a source of complex intelligence waves, a comparator circuit, means for applying energy of said intelligence waves and energy from said demodulator circuit to said comparator circuit to provide an output voltage dependent upon the difference of said energies, means for applying said voltage to control said pulses in response thereto, whereby pulses are transmitted representative of said wave, means to receive and detect the transmitted pulses, a storage device, a first electron discharge device coupled between said receiver and said storage device, means for applying said detected pulses to said electron discharge device to produce a given charge in said storage device, and a second electron discharge device coupled across said storage device and provided with circuits to effect a discharge of said storage device and provided with circuits to effect a discharge of said storage device at a given rate, such that one-half the charge due to energy transferred by a single pulse is dissipated during one normal pulse interval.

6. A communication system using discrete pulses for transmitting a complex intelligence wave, comprising a transmitter including a source of electrical pulses, a gate circuit, means for applying pulses from said source to said gate circuit, a transmitter, means coupling said gate circuit to said transmitter to key said transmitter by pulses passing said gate circuit, a demodulator circuit coupled to the output of said gate circuit, a source of complex intelligence waves, a comparator circuit, means for applying energy of said intelligence waves and energy from said demodulator circuit to said comparator circuit to provide an output voltage dependent upon the difference of said energies, means for translating said output voltage into a control voltage having a predetermined polarity and amplitude dependent upon the difference between said intelligence wave energy and said demodulator energy, and means for applying said output voltage to said gate circuit to control said gate in response to said predetermined voltage, whereby discrete pulses representative of said signals are transmitted and a receiver including means to receive and detect the transmitted pulses, a storage condenser, a device coupled in energy transfer relation to said storage condenser, means for applying said detected pulses to said device to produce transfer of a given charge to said storage condenser, a second device coupled across said second storage condenser and provided with circuits to effect a discharge of said condenser at a given rate, a low pass filter coupled across said second storage condenser to effect removal of high frequency components from the resultant voltage in said storage condenser and a signal reproducing means coupled to said filter.

7. A pulse modulation transmitter system comprising a radio frequency transmitter, a high frequency sine wave generator, means for deriving unidirectional pulses from the wave of said generator, normally open gate circuit means controlling the transmission of said pulses, a source of amplitude variable audio signals, a circuit for demodulating a given signal portion carried by the pulses being supplied to the transmitter through said gate circuit, and a signal amplitude comparator circuit for providing voltages for controlling the keying continuity at said gate circuit corresponding to the relative amplitude of said given portion from said demodulator and a signal portion from said source immediately following.

8. A system according to claim 7, further including circuit means for delaying said voltages by the width of said keying pulses.

BEN ALEXANDER.
EDMOND MAURICE DELORAINE.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,404,306 | Luck | July 16, 1946 |
| 2,438,908 | Goodall | Apr. 6, 1948 |
| 2,466,230 | Goldberg | Apr. 5, 1949 |
| 2,467,486 | Krumhansl et al. | Apr. 19, 1949 |